(12) United States Patent
Hayashida et al.

(10) Patent No.: US 7,153,558 B2
(45) Date of Patent: Dec. 26, 2006

(54) OPTICAL INFORMATION MEDIUM AND PRODUCTION METHOD THEREFOR

(75) Inventors: Naoki Hayashida, Tokyo (JP); Kazushi Tanaka, Tokyo (JP); Rie Ihara, Tokyo (JP)

(73) Assignee: TDK Corporation, Tokyo (JP)

( * ) Notice: Subject to any disclaimer, the term of this patent is extended or adjusted under 35 U.S.C. 154(b) by 161 days.

(21) Appl. No.: 10/504,054

(22) PCT Filed: May 23, 2003

(86) PCT No.: PCT/JP03/06495

§ 371 (c)(1),
(2), (4) Date: Aug. 10, 2004

(87) PCT Pub. No.: WO03/100777

PCT Pub. Date: Dec. 4, 2003

(65) Prior Publication Data

US 2005/0089665 A1    Apr. 28, 2005

(30) Foreign Application Priority Data

May 29, 2002 (JP) ............................. 2002-156518

(51) Int. Cl.
  *B32B 3/02* (2006.01)
(52) U.S. Cl. .................. 428/64.4; 430/270.11
(58) Field of Classification Search ........... 428/64.4; 430/270.11
See application file for complete search history.

(56) References Cited

U.S. PATENT DOCUMENTS

| 5,609,990 | A  | * | 3/1997 | Ha et al. ............... 430/270.11 |
| 6,376,060 | B1 | * | 4/2002 | Yoshihara et al. ......... 428/323 |
| 6,387,519 | B1 | * | 5/2002 | Anderson et al. .......... 428/447 |
| 6,623,791 | B1 | * | 9/2003 | Sadvary et al. ........... 427/140 |
| 6,924,019 | B1 | * | 8/2005 | Suzawa et al. ............ 428/64.1 |
| 2002/0054975 | A1 | | 5/2002 | Hayashida et al. |
| 2004/0013976 | A1 | * | 1/2004 | Fujimoto et al. ...... 430/270.14 |
| 2005/0008863 | A1 | * | 1/2005 | Mimura et al. ............ 428/409 |
| 2005/0106404 | A1 | * | 5/2005 | Hayashida et al. ......... 428/522 |

FOREIGN PATENT DOCUMENTS

| EP | 1146510 | 10/2001 |
| EP | 1187120 | 3/2002 |
| JP | 5-325259 | 12/1993 |
| JP | 7-169100 | 7/1995 |
| JP | 7-254169 | 10/1995 |
| JP | 8-124216 | 5/1996 |
| JP | 8-203121 | 8/1996 |
| JP | 8-235639 | 9/1996 |

(Continued)

*Primary Examiner*—Bruce Hess
(74) *Attorney, Agent, or Firm*—Oblon, Spivak, McClelland, Maier & Neustadt, P.C.

(57) ABSTRACT

The present invention provides an optical information medium that is less susceptible to warp in the disk surface while offering significantly high scratch resistance and abrasion resistance, and a method for producing the optical information medium. An optical information medium (1) comprising a supporting substrate (2) and a film element, the film element disposed on the supporting substrate (2) and composed of one or more layers including at least a recording layer (5) or a reflective layer (3), wherein at least one of the supporting substrate-side surface and the film element-side surface is formed of a hard coat layer (9) of a cured product of a composition comprising (A) inorganic fine particles with an average particle size of 100 nm or less, (B) a reactive silicone, and (C) an active energy ray-curable compound.

20 Claims, 3 Drawing Sheets

FOREIGN PATENT DOCUMENTS

| | | |
|---|---|---|
| JP | 9-54984 | 2/1997 |
| JP | 9-100111 | 4/1997 |
| JP | 10-110118 | 4/1998 |
| JP | 11-134714 | 5/1999 |
| JP | 11-213444 | 8/1999 |
| JP | 2002-230837 | 8/2002 |
| JP | 2002-245672 | 8/2002 |

* cited by examiner

OPTICAL INFORMATION MEDIUM AND PRODUCTION METHOD THEREFOR

TECHNICAL FIELD

The present invention relates to optical information media, such as read-only optical disks, optical recording disks, and magneto-optical recording disks, as well as to production methods for such optical information media. More specifically, the present invention relates to optical information media that are less susceptible to warp in the disk surface and at the same time offer significantly high scratch resistance and abrasion resistance. The invention also relates to production methods for such optical information media.

BACKGROUND ART

Polycarbonate resin materials and methyl methacrylate resin materials are currently widely used in various optical information media as optical materials of the light-transmitting layers and the like because of their moldability, transparency, and prices. One drawback of these resin materials is their lack of sufficient scratch/abrasion resistance and sufficient anti-staining property against organic stains. Another drawback is that these resin materials are easily charged because of their high insulation, so that the surfaces of the optical information media may pick up substantial amounts of dust particles during storage or use of the media, causing errors in recording/reproducing of optical information.

To improve the scratch resistance of the surface of media, a transparent, scratch-resistant hard coat is generally formed on the surface of the light-transmitting layer of the media. This is done by applying an active energy ray-polymerizable/curable compound onto the surface of the light-transmitting layer and subsequently irradiating active energy rays, such as ultraviolet rays, onto the surface to cure the compound. The active energy ray-curable compound typically includes, within its molecule, two or more polymerizable functional groups, such as (meth)acryloyl groups, that take part in polymerization. Although the hard coat obtained in this manner has higher abrasion resistance as compared to the surface of the resin films made of a polycarbonate, methyl(meth)acrylate and the like, the highest achievable abrasion resistance is still limited and the hard coat does not necessarily provide sufficient scratch resistance required during the use of the media. Use of harder resins to improve the scratch resistance generally results in an increase in the shrinkage of the hard coat upon curing, so that the resulting medium tends to suffer significant warp in the disk surface. Since the sole purpose of such hard coats is to improve the scratch resistance, the coatings generally fail to achieve sufficient anti-staining property against various contaminants, including dust particles, oil mist in the atmosphere, and fingerprints.

A hard coat having anti-staining property against organic stains is described in Japanese Patent Laid-Open Publication No. Hei 10-110118(1998). Such a hard coat can be fabricated by admixing a non-crosslinking fluorine-based surfactant to a hard coat agent. However, the non-crosslinking fluorine-based surfactant in the hard coat agent is gradually lost as the media are repeatedly cleaned by, for example, wiping over the course of their use.

It is suggested in Japanese Patent Laid-Open Publication No. Hei 11-213444(1999) to apply a fluorine-based polymer onto the surface of substrates of optical disks made of conventional materials such as polycarbonate. However, the fluorine polymer is physically adsorbed to the surface of the substrates only through the effect of van der Waals force, so that the adhesion of the fluorine-based polymer to the substrates surface is considerably weak. Thus, the surface treatment with the fluorine-based polymer coating poses a significant problem in terms of durability.

It is suggested in European Patent Publication No. EP1146510A2 to add metal chalcogenide fine particles such as silica fine particles to a hard coat to improve the scratch resistance of the hard coat. A film of a water repellant group or an oil repellent group-containing silane coupling agent is then applied over the hard coat to improve the anti-staining property of the surface.

DISCLOSURE OF THE INVENTION

Objects of the Invention

By making the coefficient of friction of the medium surface low, an impact caused when a hard projection contacts the surface can be slipped away; therefore, the generation of scratches can be suppressed. For this reason, it is desired to decrease the coefficient of friction of the surface of the hard coat to improve the scratch resistance of the surface. In recent years, attempts have been made to increase the information recording density of digital data-recording media by reducing the spot size of focused recording/reproducing laser beams. This is achieved by increasing the numerical aperture (NA) of an objective lens to focus the recording/reproducing laser beam to a value of 0.7 or higher, for instance, to approximately 0.85, and at the same time reducing the wavelength $\lambda$ of the recording/reproducing laser beam to approximately 400 nm. However, increasing NA generally leads to a decreased distance between the objective lens and the surface of the optical information medium (i.e., working distance), which significantly increases the likelihood that the surface of the optical information medium will come into contact with the objective lens, or the support of the lens, during the rotation of the optical information medium (for example, for NA of approximately 0.85, working distance is approximately 100 µm, a significant decrease from conventional optical systems). For this reason, it is desired to reduce the coefficient of friction of the hard coat surface while increasing the scratch resistance of the surface.

Addressing the above-identified problems of prior art, it is an objective of the present invention to provide an optical information medium that is less susceptible to warp in the disk surface and at the same time offers significantly high scratch resistance and abrasion resistance. It is another objective of the present invention to provide a production method for such an optical information medium that is less susceptible to warp in the disk surface and at the same time offers significantly high scratch resistance and abrasion resistance.

SUMMARY OF THE INVENTION

The present inventors made eager investigation. As a result, the present inventors have found that an optical information medium that is less susceptible to warp in the disk surface while offering significantly high scratch resistance and abrasion resistance can be obtained by forming at least one surface of the medium, preferably, the laser beam incident surface, as a hard coat layer that is formed of a cured product of a particular composition that comprises fine particles with an average particle size of 100 nm or less; a reactive silicone; and an active energy ray-curable compound.

Thus, the present invention comprises the followings:

(1) An optical information medium comprising a supporting substrate and a film element, the film element disposed on the supporting substrate and composed of one or more layers including at least a recording layer or a reflective layer, wherein at least one of the supporting substrate-side surface and the film element-side surface is formed of a hard coat layer of a cured product of a composition comprising:

(A) inorganic fine particles with an average particle size of 100 nm or less;

(B) a reactive silicone; and (C) an active energy ray-curable compound.

(2) The optical information medium according to (1) above, wherein the inorganic fine particles (A) are fine particles of a metal (or a semi-metal) oxide, or fine particles of a metal (or a semi-metal) sulfide.

(3) The optical information medium according to (1) or (2) above, wherein the inorganic fine particles (A) are fine particles of silica.

(4) The optical information medium according to (3) above, wherein the fine particles of silica are modified on the surface with a hydrolyzable silane compound including an active energy ray-reactive group.

(5) The optical information medium according to any of (1) to (4) above, wherein the reactive silicone (B) comprises at least one reactive group selected from the group consisting of (meth)acryloyl group, vinyl group, and mercapto group.

(6) The optical information medium according to any of (1) to (5) above, wherein the reactive silicone (B) comprises two or more (meth)acryloyl groups within its molecule.

(7) The optical information medium according to any of (1) to (6) above, wherein the composition comprises 5 wt % or more and 80 wt % or less of the inorganic fine particles (A), 0.01 wt % or more and 1 wt % or less of the reactive silicone (B), and 19 wt % or more and 94.99 wt % or less of the active energy ray-curable compound (C) with respect to the total amount of the components (A), (B), and (C).

(8) The optical information medium according to any of (1) to (7) above, wherein the composition further comprises a photopolymerization initiator.

(9) The optical information medium according to any of (1) to (8) above, wherein information is optically recorded or reproduced by the light incident upon the supporting substrate-side or the film element-side of the information medium.

(10) The optical information medium according to any of (1) to (9) above, wherein either one of the supporting substrate-side surface or the film element-side surface upon which the light is incident is formed of the hard coat layer.

(11) A method for producing an optical information medium, comprising the steps of:

forming, on a supporting substrate, a film element composed of one or more layers including at least a recording layer or a reflective layer;

applying a composition onto at least one of the surface of the film element and the surface of the supporting substrate opposite to the film element-formed side, the composition comprising (A) inorganic fine particles with an average particle size of 100 nm or less, (B) a reactive silicone, and (C) an active energy ray-curable compound; and irradiating active energy rays onto the applied composition to cure the composition and to thus form a hard coat layer.

(12) The method for producing an optical information medium according to (11) above, wherein the composition further comprises a non-reactive organic solvent, and following the application of the composition and prior to the irradiation of the active energy rays to cure the composition and to thus form a hard coat layer, the non-reactive organic solvent is removed by heat-drying.

(13) An optical information medium, obtainable by forming, on a supporting substrate, a film element composed of one or more layers including at least a recording layer or a reflective layer;

applying a composition onto at least one of the surface of the film element and the surface of the supporting substrate opposite to the film element-formed side, the composition comprising (A) inorganic fine particles with an average particle size of 100 nm or less, (B) a reactive silicone, and (C) an active energy ray-curable compound; and irradiating active energy rays onto the applied composition to cure the composition and to thus form a hard coat layer.

As used herein, the term "optical information medium" is intended to encompass read-only optical disks, optical recording disks, magneto-optical recording disks, and other media.

MODES FOR CARRYING OUT THE INVENTION

An optical recording medium (for brevity to be referred to hereinafter as "optical disk") and a method for producing the same of the present invention will be described with reference to FIG. 1. Although the description will be given of a phase change type optical disk as an example, the present invention is not limited to this, but is widely applicable to various optical disks with any type of recording layers, including read-only optical disks, and write-once optical disks and the like.

Figure 1:
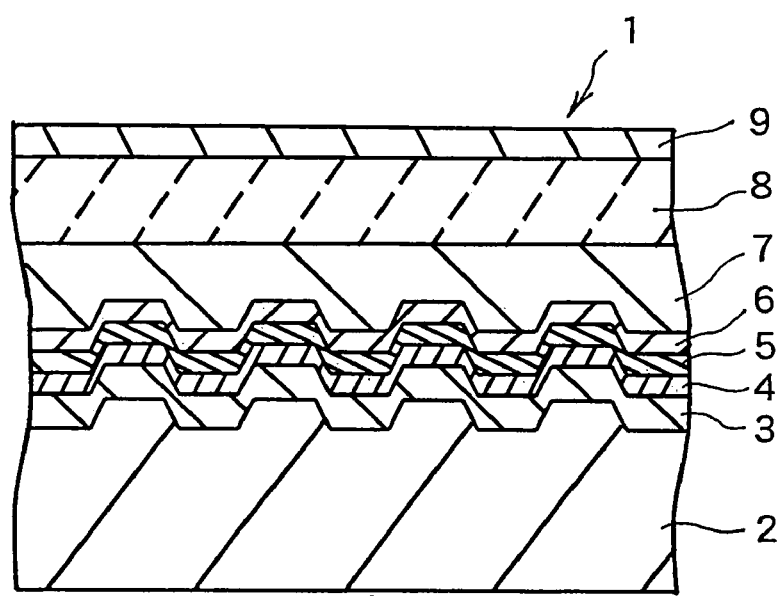
FIG. 1 is a schematic cross sectional view of one example of an optical disk of the present invention.

FIG. 1 is a schematic cross sectional view of one example of an optical disk of the present invention. In FIG. 1, an optical disk (1) has a supporting substrate (2) having information pits, pregrooves, and other fine scale concavities-convexities formed on one surface thereof. On this surface, the optical disk (1) has a reflective layer (3), a second dielectric layer (4), a recording layer (5), and a first dielectric layer (6) formed in this order, and further has a resin layer (7) on the first dielectric layer (6), a light transmitting layer (8) on the resin layer (7), and a hard coat layer (9) on the light transmitting layer (8). In this example, a film element necessary for recording and/or reproducing is formed of the reflective layer (3), the second dielectric layer (4), the recording layer (5), the first dielectric layer (6), the resin layer (7), and the light transmitting layer (8). When using the optical disk (1), a laser beam for recording and/or reproducing is incident through the hard coat layer (9) and the light transmitting layer (8), namely the film element side.

The supporting substrate (2) has a thickness of 0.3 to 1.6 mm, preferably of 0.5 to 1.3 mm, and includes information pits, pregrooves, and other fine scale concavities-convexities formed on the surface on which the recording layer (5) is formed.

The supporting substrate (2) is not required to be optically transparent when the optical disk (1) is used in such a manner that a laser beam is incident through the film element side as described above, while is required to be optically transparent when the optical disk (1) is used in such a manner that a laser beam is incident through the side of the supporting substrate (2). As transparent materials, various plastic materials including polycarbonate resins, acrylic resins such as polymethyl methacrylate (PMMA), and polyolefine resins and the like may be used. Such flexible materials are particularly useful in the present invention since the present invention can control their warping. It should be noted, however, that glass, ceramics or metals and the like may be also used for the supporting substrate. If a plastic material is employed, the pattern of the concavity-convexity in the surface will be often produced by injection molding, whereas the pattern will be formed by a photopolymer process (2P process) in the case of any material other than plastics.

The reflective layer (3) is usually deposited by a sputtering process on the supporting substrate (2). As a material for the reflective layer, a metallic element, semi-metallic element, semiconductor element or a compound thereof may be used singly or compositely. More specifically, the material may be selected from known materials for the reflective layers such as Au, Ag, Cu, Al, and Pd. The reflective layer is preferably formed as a thin film with a thickness of 20 to 200 nm.

The second dielectric layer (4), the recording layer (5), and the first dielectric layer (6) are deposited in this order by sputtering process on the reflective layer (3), or on the supporting substrate (2) in the case that no reflective layer is provided.

The recording layer (5) is formed of a material changing reversibly by irradiation of laser beam between the crystalline state and the amorphous state, and exhibiting different optical properties between these states. Examples of such material include Ge—Sb—Te, In—Sb—Te, Sn—Se—Te, Ge—Te—Sn, In—Se—Tl, and In—Sb—Te. Further, to any such material, a trace of at least one metal selected from Co, Pt, Pd, Au, Ag, Ir, Nb, Ta, V, W, Ti, Cr, Zr, Bi, In and the like may be added. A trace of reductive gas such as nitrogen also may be added. There is no limitation to the thickness of the recording layer (5), which is for example in a range of about 3 to 50 nm.

The second dielectric layers (4) and the first dielectric layer (6) are formed on the top and under surfaces of the recording layer (5), respectively, so as to sandwich the same. The second dielectric layers (4) and the first dielectric layer (6) have not only a function of protecting the recording layer (5) mechanically and chemically but also a function as an interference layer for adjusting the optical properties. The second dielectric layers (4) and the first dielectric layer (6) may each consist of either a single layer or a plurality of layers.

The second dielectric layers (4) and the first dielectric layer (6) is preferably formed of an oxide, a nitride, a sulfide, or a fluoride or a composite thereof, containing at least one metal selected from Si, Zn, Al, Ta, Ti, Co, Zr, Pb, Ag, Zn, Sn, Ca, Ce, V, Cu, Fe, and Mg. Further, the second dielectric layers (4) and the first dielectric layer (6) preferably have an extinction coefficient k of 0.1 or less.

There is no limitation to the thickness of the second dielectric layer (4), which is preferably for example in a range of about 20 to 150 nm. There is no limitation to the thickness of the first dielectric layer (6), either, which is preferably for example in a range of about 20 to 200 nm. Setting the thicknesses of the second dielectric layers (4) and the first dielectric layer (6) in these ranges makes it possible to adjust reflection.

The resin layer (7) having light transmission properties is formed on the first dielectric layer (6) by using active energy ray-curable material.

The active energy ray-curable material should be optically transparent, exhibit low optical absorption or reflection in the laser wavelength range to be used, and have low birefringence, and is selected from ultraviolet ray-curable materials, electron ray-curable materials and the like on these conditions.

Specifically, the active energy ray-curable material is constituted preferably of the ultraviolet ray-(electron ray-) curable compound or its composition for polymerization. Examples include monomers, oligomers, polymers and the like in which groups to be crosslinked or polymerized by irradiation with ultraviolet rays, such as acrylic type double bonds such as in ester compounds of acrylate and methacrylate, epoxy acrylates and urethane acrylates, allyl type double bonds such as in diallyl phthalate, and unsaturated double bonds such as in maleic acid derivatives and the like have been contained or introduced into a molecule. These are preferably polyfunctional, particularly trifunctional or more, and may be used alone or in combination thereof. While monofunctional ones may be used for necessary.

The ultraviolet ray-curable monomer is preferably a compound with a molecular weight of less than 2000, and the oligomer is preferably a compound with a molecular weight of 2000 to 10000. These include styrene, ethyl acrylate, ethylene glycol diacrylate, ethylene glycol dimethacrylate, diethylene glycol diacrylate, diethylene glycol methacrylate, 1,6-hexane glycol diacrylate, 1,6-hexane glycol dimethacrylate etc., and particularly preferable examples include pentaerythritol tetra(meth)acrylate, pentaerythritol (meth)acrylate, trimethylolpropane tri(meth)acrylate, trimethylolpropane di(meth)acrylate, (meth)acrylate of phenol ethylene oxide adduct, etc. Besides, the ultraviolet ray-curable oligomer includes oligoester acrylate, acrylic modified urethane elastomer etc.

The ultraviolet ray-(electron ray-) curable material may contain known photopolymerization initiators. The photopolymerization initiator is not particularly necessary when electron rays are used as the active energy rays. However, when ultraviolet rays are used, the initiator is necessary. The photopolymerization initiator may be properly selected from the usual photopolymerization initiators such as acetophenone, benzoin, benzophenone, thioxanthone. Examples of a radical photo initiator, among the photopolymerization initiators, include DAROCURE 1173, IRGACURE 651, IRGACURE 184, and IRGACURE 907 (all of which are products manufactured by Ciba Specialty Chemicals Inc.). The content by percentage of the photopolymerization initiator is, for example, from about 0.5 to 5 wt % with respect to the ultraviolet ray-(electron ray-) curable component.

As the ultraviolet ray-curable material, a composition containing epoxy compound and a photo-cation polymerization catalyst is also preferably used. The epoxy compound is preferably alicyclic epoxy compound, particularly the compound having 2 or more epoxy groups in the molecule. The alicyclic epoxy compound is preferably one or more of the following compounds: 3,4-epoxycyclohexyl methyl-3,4-epoxycyclohexane carboxylate, bis-(3,4-epoxy-cyclohexylmethyl) adipate, bis-(3,4-epoxycyclohexyl) adipate, 2-(3,4-epoxycyclohexyl-5,5-spiro-3,4-epoxy) cyclohexane-metha-dioxane, bis(2,3-epoxycyclopentyl) ether and vinyl cyclohexene dioxide etc. Although the epoxy equivalent of alicyclic epoxy compound is not particularly limited, it is preferably 60 to 300, more preferably 100 to 200 for attaining excellent curable properties.

The photo-cation polymerization catalyst used may be any of known ones and is not particularly limited. For example, it is possible to use one or more of the followings: metal fluoroborates and boron trifluoride complexes, bis (perfluoroalkyl sulfonyl) methane metal salts, aryl diazonium compounds, aromatic onium salts of the group 6A elements, aromatic onium salts of the group 5A elements, dicarbonyl chelate of the groups 3A to 5A elements, thiopyrylium salts, the group 6A elements having MF6 anions (M is P, As or Sb), triaryl sulfonium complex salts, aromatic iodonium complex salts, aromatic sulfonium complex salts etc., and it is particularly preferable to use one or more of the followings: polyaryl sulfonium complex salts, aromatic sulfonium salts or iodonium salts of halogen-containing complexions, and aromatic onium salts of the group 3A elements, the group 5A elements and the group 6A elements. The content by percentage of the photo-cation polymerization catalyst is, for example, from about 0.5 to 5 wt % of the ultraviolet ray-curable component.

The active energy ray-curable material used for the resin layer preferably has a viscosity of 3 to 500 cp (at 25° C.).

The resin layer (7) can be formed by applying the active energy ray-curable material onto the first dielectric layer (6) using the spin coating technique. The thickness of the resin layer (7) after curing may be adjusted to approximately 1 to 50 μm.

Subsequently, a light-transmitting sheet to serve as the light-transmitting layer (8) is placed on the still uncured resin layer (7) and the active energy rays, such as ultraviolet rays, are then irradiated to cure the resin layer (7). As a result, the light-transmitting sheet is adhered to serve as the light-transmitting layer (8). The light-transmitting sheet may, for example, be a polycarbonate sheet with a desired thickness ranging from 50 to 300 μm. More specifically, the light-transmitting layer (8) is formed by placing the polycarbonate sheet having a desired thickness on the still uncured resin layer (7) in vacuum (0.1 atom or less), allowing the pressure to return to atmospheric pressure, and then irradiating ultraviolet rays to cure the resin layer (7).

Alternatively, the resin layer (7) may be formed to a sufficiently large thickness to serve also as the light-transmitting layer so that the polycarbonate sheet can be dispensed with. In such cases, the resin layer (7) may have a thickness of approximately 50 to 300 μm after curing. While the same active energy ray-curable materials as those described above may be used, the materials preferably have a viscosity of 1,000 to 10,000 cp (at 25° C.).

A composition for the hard coat layer is then applied onto the light-transmitting layer (8) and active energy rays, such as ultraviolet rays, electron rays, or visible rays, are then irradiated to cure the composition and to thereby form the hard coat layer (9). The composition contains (A) inorganic fine particles with an average particle size of 100 nm or less, (B) a reactive silicone, and (C) an active energy ray-curable compound other than those described in (B) above. The components of the composition for the hard coat layer are described below.

The active energy ray-curable compound (C) for use in the composition for the hard coat layer may have any structure, provided that it contains at least one active group selected from (meth)acryloyl group, vinyl group, and mercapto group. To ensure sufficient hardness of the hard coat, the active energy ray-curable compound preferably includes a polyfunctional monomer or a polyfunctional oligomer that contains, in one molecule, two or more, preferably three or more polymerizable groups. If used in excess, the polyfunctional monomer or the polyfunctional oligomer causes an increase in the contraction of the hard coat upon curing and, thus, a substantial warp in the disk, though the hard coat will become sufficiently hard. It should be given attention.

Among such active energy ray polymerizable compounds (C) examples of the compound having (meth)acryloyl group include 1,6-hexanediol di(meth)acrylate, triethylene glycol di(meth)acrylate, ethylene oxide modified bisphenol A di(meth)acrylate, trimethylolpropane tri(meth)acrylate, pentaerythritol tetra(meth)acrylate, ditrimethylolpropane tetra (meth)acrylate, dipentaerythritol hexa(meth)acrylate, pentaerythritol tri(meth)acrylate, 3-(meth)acryloyloxyglycerin mono(meth)acrylate, urethane acrylate, epoxy acrylate, and ester acrylate. However, the compound having (meth)acryloyl group is not limited to these examples.

Examples of the compound having vinyl group include ethylene glycol divinyl ether, pentaerythritol divinyl ether, 1,6-hexanediol divinyl ether, trimethylolpropane divinyl ether, ethylene oxide modified hydroquinone divinyl ether, ethylene oxide modified bisphenol A divinyl ether, pentaerythritol trivinyl ether, dipentaerythritol hexavinyl ether, and ditrimethylolpropane polyvinyl ether. However, the compound having vinyl group is not limited to these examples.

Examples of the compound having mercapto group include ethylene glycol bis(thioglycolate), ethylene glycol bis (3-mercaptopropionate), trimethylolpropane tris(thioglycolate), trimethylolpropane tris(3-mercaptopropionate), pentaerythritol tetrakis(mercaptoacetate), pentaerythritol tetrakis(thioglycolate), and pentaerythritol tetrakis(3-mercaptopropionate). However, the compound having mercapto group is not limited to these examples.

The active energy ray-curable compounds (C) contained in the composition for the hard coat layer may be used alone or in combination of two or more thereof.

The inorganic fine particles (A) for use in the composition for the hard coat layer have an average particle size of 100 nm or less, preferably 20 nm or less, to ensure the transparency of the hard coat layer. Preferably, the average particle size of the inorganic fine particles (A) is 5 nm or larger to meet the requirements for making a colloidal solution.

The inorganic fine particles (A) may, for example, be fine particles of metal (or semi-metal) oxides, or fine particles of metal (or a semi-metal) sulfides. Examples of the metals or semi-metals for the inorganic fine particles include Si, Ti, Al, Zn, Zr, In, Sn, and Sb. Aside from the oxides and sulfides, the inorganic fine particles (A) may include selenides, tellurides, nitrides, and carbides. Examples of the inorganic fine particles include fine particles of silica, alumina, zirconia, and titania. Of these, silica fine particles are preferred. When added to the hard coat agent composition, such inorganic fine particles enhance the abrasion resistance of the hard coat layer.

The silica fine particles are preferably surface modified with a hydrolyzable silane compound containing active energy ray-reactive groups. Such reactive silica fine particles undergo a crosslinking reaction when exposed to active energy rays during curing of the hard coat and are fixed in the polymer matrix. One example of such reactive silica fine particles is the one described in Japanese Patent Laid-Open Publication No. Hei 9-100111 (1997), which is suitable for use in the present invention.

The reactive silicone (B) contained in the composition for the hard coat layer may be of any type, provided that it imparts water repellency and/or lubricity to the hard coat layer and it contains functional groups that cause polymerization to occur when exposed to active energy rays. For instance, the reactive silicone (B) may be a silicone compound containing at least one active energy ray-polymerizable functional group selected from (meth)acryloyl group, vinyl group, and mercapto group.

The silicone compounds may include compounds containing a moiety with a silicone-based substituent and at least one type of reactive group selected from (meth)acryloyl group, vinyl group, and mercapto group. Specific examples include, but are not limited to, compounds as represented by the following formulae (1) to (3):

and

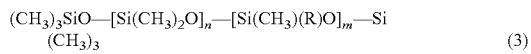

wherein R is a substituent containing at least one type of reactive group selected from (meth)acryloyl group, vinyl group, and mercapto group; and n and m each represent the degree of polymerization.

These reactive silicones (B) may be used either individually or in combination of two or more.

When added to the composition for the hard coat layer, the reactive silicone (B) imparts lubricity to the surface of the hard coat layer (9), thereby making the surface of the hard coat layer (9) less susceptible to scratches. Containing the active energy ray-polymerizable functional groups, the reactive silicone undergoes a crosslinking reaction when exposed to the active energy rays during curing of the hard coat and is fixed in the polymer matrix. To ensure that the crosslinking reaction takes place, the reactive silicone preferably includes two or more reactive groups, preferably two or more (meth)acryloyl groups, within its molecule. In this manner, media can be obtained that exhibit high scratch resistance/abrasion resistance under various conditions for storage and use.

Preferably, the reactive silicone has an average molecular weight of $1.0 \times 10^2$ or more and $1.5 \times 10^4$ or less. The reactive silicone cannot provide the desired lubricity when the average molecular weight is less than $1.0 \times 10^2$. On the other hand, when the average molecular weight is greater than $1.5 \times 10^4$, the compatibility of the reactive silicone in the composition for the hard coat layer tends to be decreased, making uniform coating difficult.

The reactive silicone is preferably a compound that includes two or more reactive groups within its molecule and has a formula weight per one silicone unit of 3000 or less. The reactive silicone may include, a side from the silicone units, polyether or polymethylene units within its molecule.

Preferred reactive silicones are compounds represented by the formula (1) in which R on each end is (meth)acryloyl group and the silicone unit represented by $—[Si(CH_3)_2O]_n—$ has a formula weight of 3000 or less. More preferred reactive silicones are those in which R on each end is (meth)acryloyl group and the silicone unit represented by $—[Si(CH_3)_2O]_n—$ has a formula weight of 2000 or less.

In the present invention, the composition for the hard coat layer preferably contains 5 wt % or more and 80 wt % or less of the inorganic fine particles (A), 0.01 wt % or more and 1 wt % or less of the reactive silicone (B), and 19 wt % or more and 94.99 wt % or less of the active energy ray-curable compound (C) with respect to the total amount of the components (A), (B), and (C). The film strength of the hard coat layer tends to be reduced when the amount of the inorganic fine particles (A) exceeds 80 wt %, whereas the effect of the fine particles to improve the abrasion resistance of the hard coat layer is insufficient when the amount of the fine particles is less than 5 wt %. While the lubricity of the hard coat layer is improved, the hardness of the hard coat layer tends to be reduced when the amount of the reactive silicone (B) exceeds 1 wt %. On the other hand, the effect of the reactive silicone (B) to improve the lubricity is insufficient when the amount of the reactive silicone is less than 0.01 wt %. A more preferred ratio of these components in the composition for the hard coat layer is as follows: 10 wt % or more and 60 wt % or less of the inorganic fine particles (A), 0.01 wt % or more and 1 wt % or less of the reactive silicone (B), and 39 wt % or more and 89.99 wt % or less of the active energy ray-curable compound (C) with respect to the total amount of the components (A), (B) and (C).

The composition for the hard coat layer may contain known photopolymerization initiators. The photopolymerization initiator is not particularly necessary when electron rays are used as the active energy rays. However, when ultraviolet rays are used, the initiator is necessary. Examples of a radical photo initiator, among the photopolymerization initiators, include DAROCURE 1173, IRGACURE 651, IRGACURE 184, and IRGACURE 907 (all of which are products manufactured by Ciba Specialty Chemicals Inc.). The content by percentage of the photopolymerization initiator is, for example, from about 0.5 to 5 wt % with respect to the total amount of the components (A), (B), and (C).

When necessary, the composition for the hard coat layer may contain a non-reactive organic diluent, a photopolymerization co-initiator, an organic filler, a polymerization inhibitor, an antioxidant, an ultraviolet ray absorber, a photo-stabilizer, an antifoamer, a leveling agent, a pigment, and a silicon compound and others.

In the present invention, the composition for the hard coat layer is applied onto the light-transmitting layer (8) to form an uncured hard coat layer. Subsequently, the active energy rays are irradiated to cure the uncured layer to form the hard coat layer (9). The composition can be applied using any proper coating technique, including spin coating, dip coating, and gravure coating. In an alternate method in which a light-transmitting sheet is used to serve as the light-transmitting layer (8), the hard coat layer (9) is first formed onto an elongate raw light-transmitting sheet as described above, and disks are subsequently stamped out from the raw sheet. In the same manner as described above, the disks are placed on the uncured resin layer (7) and the uncured resin layer (7) is cured.

When the composition for the hard coat layer contains the non-reactive organic diluent, the composition for the hard coat layer is first applied to form an uncured hard coat layer, which is then dried by heating to remove the non-reactive organic solvent. Subsequently, the active energy rays are irradiated to cure the uncured layer and to thereby form the hard coat layer (9). By first applying the organic diluent-containing composition for the hard coat layer and then removing the organic solvent by heating, the reactive silicone tends to concentrate in the proximity of the surface of the uncured hard coat layer. The result is more silicone existing in the proximity of the surface of the cured hard coat layer (9). This further enhances the lubricity. The heating/drying process is preferably carried out at a temperature of for example 40° C. or more and 100° C. or less and over a time period of for example 30 seconds or more and 8 minutes or less, preferably 1 minute or more and 5 minutes or less, and more preferably 3 minutes or more and 5 minutes or less. Examples of the non-reactive organic diluent include, but are not limited to, propyleneglycol monomethylether acetate, propyleneglycol monomethylether, ethyleneglycol monomethylether, butyl acetate, methyl ethyl ketone, methyl isobutyl ketone, and isopropyl alcohol. The active energy rays may be properly selected from ultraviolet rays, electron rays, visible rays, and other proper active energy rays. Preferably, ultraviolet rays or electron rays are used. The thickness of the hard coat (9) after curing is adjusted to about 0.5 to 5 µm.

EXAMPLES

The present invention will now be described in detail with reference to examples, which are not intended to limit the scope of the invention in any way.

[Preparation of Compositions for Hard Coat Layer]

The following base compositions (a), (b), and (c) for ultraviolet ray-curable materials were prepared:

| (Base composition (a)) | |
| --- | --- |
| Reactive group-modified colloidal silica (dispersion medium = propyleneglycol monomethylether acetate, non-volatile component = 40 wt %) | 100 parts by weight |
| Dipentaerythritol hexaacrylate | 48 parts by weight |
| Tetrahydrofurfuryl acrylate | 12 parts by weight |
| Propyleneglycol monomethylether acetate (Non-reactive diluent) | 40 parts by weight |
| IRGACURE 184 (Polymerization initiator) | 5 parts by weight |
| (Base composition (b)) | |
| Phenoxyethylacrylate | 35 parts by weight |
| 1,6-hexanedioldiacrylate | 45 parts by weight |
| Trimethylolpropane triacrylate | 20 parts by weight |
| IRGACURE 184 (Polymerization initiator) | 5 parts by weight |
| (Base composition (c)) | |
| Dicyclopentanyl acrylate | 30 parts by weight |
| 1,6-hexanedioldiacrylate | 20 parts by weight |
| Pentaerythritol triacrylate | 25 parts by weight |
| Pentaerythritol tetraacrylate | 25 parts by weight |
| IRGACURE 184 (Polymerization initiator) | |

The reactive silicones shown in Table 1 were then added to the base compositions (a), (b), and (c) to obtain compositions a-1, a-2, a-3, b-1, and c-1 for forming respective hard coat layers. 0.25 parts by weight of each of the reactive silicones were added to 100 parts by weight of the corresponding base composition. For the base composition (a), 0.25 parts by weight of each of the corresponding reactive silicones were added with respect to 100 parts by weight of the non-volatile component in the composition (a).

TABLE 1

| Composition for hard coat layer No. | Base composition | Reactive silicone |
| --- | --- | --- |
| a-1 | Composition (a) | X-24-8201 (Monofunctional silicone methacrylate, molecular weight: about 2000, manufactured by Shin-Etsu Chemical Co., Ltd.) |
| a-2 | Composition (a) | X-22-164A (bifunctional silicone methacrylate, molecular weight: about 1900, manufactured by Shin-Etsu Chemical Co., Ltd.) |
| a-3 | Composition (a) | — |
| b-1 | Composition (b) | X-22-164A (bifunctional silicone methacrylate, molecular weight: about 1900, manufactured by Shin-Etsu Chemical Co., Ltd.) |
| c-1 | Composition (c) | X-22-164A (bifunctional silicone methacrylate, molecular weight: about 1900, manufactured by Shin-Etsu Chemical Co., Ltd.) |

Examples 1 and 2, and Comparative Examples 1 to 3

A sample optical recording disk having a layered structure as shown in FIG. 1 was prepared in the following manner. A 100 nm thick reflective layer (3) of $Al_{98}Pd_1Cu_1$ (in atomic ratio) was deposited on the surface of a grooved disk-shaped supporting substrate (2) (formed of polycarbonate, 120 mm in diameter and 1.2 mm in thickness) by sputtering. The depth of the above grooves, which is represented by light-path length at wavelength $\lambda$=405 nm, was set into $\lambda/6$. The recording track pitch in the groove-recording scheme was set into 0.32 µm.

A 20 nm thick second dielectric layer (4) was then deposited on the surface of the reflective layer (3) by sputtering using an $Al_2O_3$ target. On the surface of the second dielectric layer (4), a 12 nm thick recording layer (5) was then deposited by sputtering using an alloy target formed of a phase-changing material. The composition of the recording layer (5) (in atomic ratio) was $Sb_{74}Te_{18}$ ($Ge_7In_1$). Subsequently, a 130 nm thick first dielectric layer (6) was deposited on the surface of the recording layer (5) by sputtering using a ZnS (80 mol %)-$SiO_2$ (20 mol %) target.

A solution of an ultraviolet ray-curable resin that can undergo radical polymerization (4X108E, manufactured by MITSUBISHI RAYON, solvent=butyl acetate) was then applied onto the surface of the first dielectric layer (6) by spin-coating to form a resin layer (7). The solution was applied in such a manner that the resulting resin layer (7) was 2.0 µm thick after curing.

Subsequently, a 100 µm thick polycarbonate sheet was placed on the resin layer (7) in vacuum (0.1 atm or below). PUREACE (manufactured by Teijin) produced by flow-casting was used as the polycarbonate sheet. The pressure was then allowed to return to atmospheric pressure and ultraviolet rays were irradiated to cure the resin layer (7). As a result, the polycarbonate sheet was adhered to the resin layer (7) to serve as a light-transmitting layer (8).

One of the compositions for respective hard coat layers, i.e., a-1 (Example 1), a-2 (Example 2), a-3 (Comparative Example 1), b-1 (Comparative Example 2), and c-1 (Comparative Example 3), was then applied onto the surface of the light-transmitting layer (8) by spin-coating. Ultraviolet rays were then irradiated to cure the composition and to thereby form a hard coat layer (9). The same procedures were followed to prepare a sample disk for each composition. For each composition, the hard coat layer (9) was approximately 1.5 μm thick after curing. For the compositions a-1, a-2, and a-3, the disk was heated at 60° C. for 3 minutes after application of the composition and prior to exposure to ultraviolet rays to remove the diluent solvent remaining in the coating and to thereby form the hard coat layer (9).

In this manner, sample optical recording disks No. 1 (Example 1), No. 2 (Example 2), No. 3 (Comparative Example 1), No. 4 (Comparative Example 2), and No. 5 (Comparative Example 3) were prepared.

Comparative Example 4

A sample optical recording disk No. 0 was prepared in the same manner as in Example 1, except that the hard coat layer (9) was not formed.

(Evaluation)

The following performance tests were conducted on each of the sample optical recording disks No. 0 through No. 5 prepared in Examples 1 and 2 and Comparative Examples 1 through 4.

(1) Degree of Warp in the Disk Surface (Tilt)

Using a machine accuracy-measuring apparatus DC-1010C (manufactured by CORES), each sample disk was measured for the tilt angle (deg.) along the radius of the disk. The sample disks were measured for the initial tilt angle and the tilt angle after the disks were stored in a high temperature, high humidity environment (Temperature=80° C., Relative humidity 85%, Storage period=100 hours). The results are shown in Table 2 below. In Table 2, positive numbers indicate that the disks were warped concavely toward the light-transmitting layer and negative numbers indicate that the disks were warped in the opposite direction.

(2) Scratch Resistance During Contact with an Optical Head

Using an optical disk evaluation apparatus (DDU1000, manufactured by PULSTEC), the optical head contact test was conducted in the following manner: Each sample optical disk was mounted on a spindle motor of the evaluation apparatus with the hard coat surface facing upward. The height of the optical head was adjusted so that the distance between the tip of the optical head and the surface of the optical disk was approximately 0.5 mm. The spindle motor was operated at 2000 rpm and the focus servo of the apparatus was activated to drive the actuator of the optical head. This caused the tip of the optical head to repeatedly come into contact with the hard coat surface of the optical disk at certain time intervals. After 10 contacts between the tip of the optical head and the hard coat surface of the optical disk, the focus servo was deactivated and the optical disk was removed. The hard coat surface of the optical disk was visually inspected for the presence or absence of scratches. Five sample optical disks were tested for each of Examples and Comparative Examples, and the scratch resistance was evaluated based on the number of the scratched samples. For the sample optical disks of Comparative Example 4, visual inspection for the presence or absence of scratches was performed on the surface of the light-transmitting layer.

The optical head mounted on the evaluation apparatus included a plastic objective lens surrounded by a disk-shaped ABS-resin protective plate. It was this protective plate that came into contact with the hard coat surface during the test.

(3) Coefficient of Friction

Figure 2:
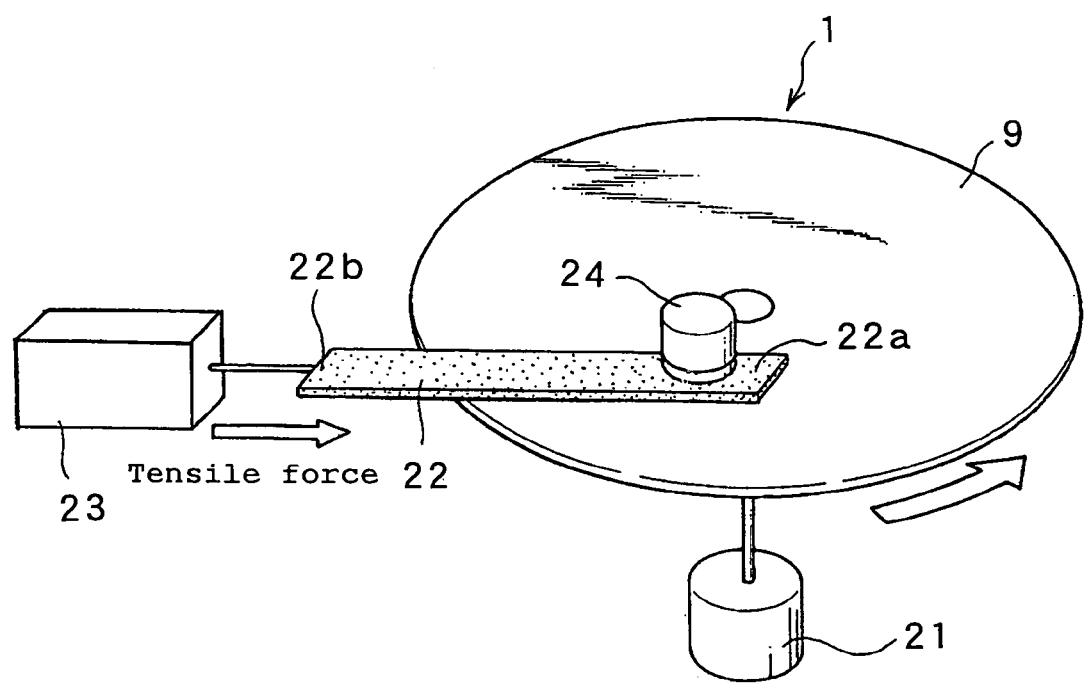
FIG. 2 is a diagram illustrating a manner by which the coefficient of friction of the optical disk is measured.

According to the scheme depicted in FIG. 2, the coefficient of friction of the hard coat surface was determined for each sample optical disk. The sample disks were measured for each of the initial coefficient of friction, the coefficient of friction after the disks were stored in a high temperature, high humidity environment (Temperature=80° C., Relative humidity=85%, Storage period=100 hours), and the coefficient of friction after the disks were stored in a high temperature, low humidity environment (Temperature=80° C., Relative humidity=lower than 5%, Storage period=100 hours).

As shown in FIG. 2, a sample optical disk (1) was mounted on a spindle motor (21) with the hard coat surface (9) facing upward. A 10 mm wide, 100 mm long strip (22) of non-woven fabric (Bemcot Lint-Free CT-8, manufactured by Asahi Kasei Co., Ltd.) was placed on the hard coat surface (9) of the optical disk, and a weight (24) was placed on one end (22a) of the non-woven fabric (22) to apply a load of 0.1 N/cm$^2$. The weight (24) was positioned about 40 mm radially away from the center of the disk and the non-woven fabric (22) was oriented so that the length direction thereof was perpendicular to the radial direction connecting the center of the disk to the position of the weight (24). With the other end (22b) of the non-woven fabric (22) anchored to a transducer (23), the optical disk (1) was rotated at a rate of 600 rpm and the frictional force acting upon the non-woven fabric (22) was detected by the transducer (23) to determine the coefficient of friction.

Figure 3:
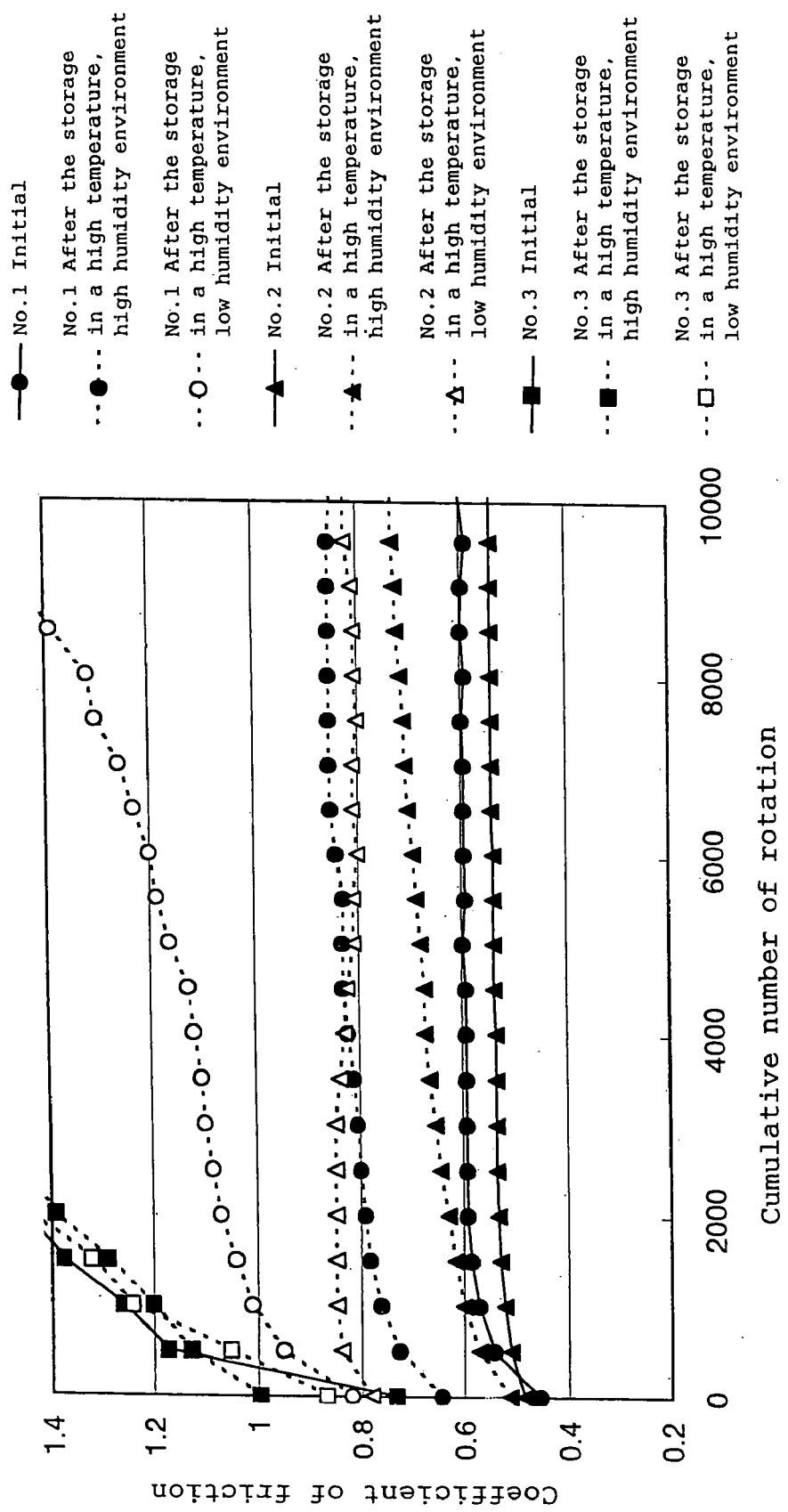
FIG. 3 is a graph showing the results of the measurement of the coefficient of friction of the optical disk (cumulative number of rotation versus coefficient of friction).

The sample optical disk No. 0 of Comparative Example 4 proved to have a significantly low scratch resistance of the surface of the light-transmitting layer: the samples received significant scratches during the measurement under the above-described conditions. The results of the measurement of the coefficient of friction of the sample optical disks No. 1 to No. 3 are shown in FIG. 3 (cumulative number of rotation versus coefficient of friction).

TABLE 2

| | Sample optical disk No. | Composition for hard coat layer No. | Tilt (Radial direction, unit: deg) | | Scratch resistance (Number of the scratched samples) |
|---|---|---|---|---|---|
| | | | Initial | After the storage in a high temperature, high humidity environment | |
| Comparative Example 4 | No. 0 | — | 0.09 | 0.03 | 5 |

TABLE 2-continued

| | Sample optical disk No. | Composition for hard coat layer No. | Tilt (Radial direction, unit: deg) | | Scratch resistance (Number of the scratched samples) |
| --- | --- | --- | --- | --- | --- |
| | | | Initial | After the storage in a high temperature, high humidity environment | |
| Example 1 | No. 1 | a-1 | 0.15 | 0.23 | 0 |
| Example 2 | No. 2 | a-2 | 0.10 | 0.24 | 0 |
| Comparative Example 1 | No. 3 | a-3 | 0.08 | 0.15 | 5 |
| Comparative Example 2 | No. 4 | b-1 | 0.15 | 0.21 | 3 |
| Comparative Example 3 | No. 5 | c-1 | 0.32 | 0.51 | 0 |

The results are shown in Table 2.

As can be seen from Table 2, the initial warp was significantly small for each of the sample optical disks No. 1 and No. 2 and remained small after storage in high-temperature, high humidity environment. Thus, the sample optical disks No. 1 and No. 2 proved to be suitable for practical use. None of the five samples of No. 1 and No. 2 received scratches in the optical head contact test. The samples also showed significantly high initial scratch resistance.

As shown by the results of the measurement of the coefficient of friction in FIG. 3, the coefficient of friction of the sample No. 1 was initially small, indicating that the scratch resistance, or lubricity, of the sample No. 1 was initially as high as that of the sample No. 2. The sample No. 1, however, showed somewhat higher coefficient of friction as compared to the sample No. 2. The difference became significant especially after storage in high-temperature, low humidity environment. The reason for this is considered to be as follows: since the silicone acrylate used in the sample No. 1 was monofunctional, the crosslinking between the silicone acrylate and the base material could not proceed to a sufficient degree. This could result in the degradation or evaporation of the unreacted silicone acrylate, or migration of the unreacted silicone acrylate into the depth of the coating film under high temperature conditions. As a result, the silicone density on the hard coat surface was decreased, leading to a high coefficient of friction. In comparison, the crosslinking between the highly reactive bifunctional silicone acrylate and the base material proceeded to a high degree in the sample No. 2, so that the silicone density on the hard coat surface of the sample No. 2 was not significantly decreased even under high temperature conditions. As a result, only slight increase was observed in the coefficient of friction even after storage in high temperature, low humidity environment. Thus, it can be inferred that the sample No. 2 can retain high scratch resistance after storage in a high temperature environment, in particular, in a high temperature, low humidity environment. These observations suggest that bifunctional or higher polyfunctional silicones are suitable for use as the reactive silicone.

All of the five of the sample optical disks No. 3 received scratches in the optical head contact test. Although the hard coat layers of the samples No. 3 used the same base material (a) as that used in the samples No. 1 and No. 2 and thus had a high hardness, the lack of the reactive silicone in the hard coat agent resulted in insufficient lubricity of the hard coat surface, making the samples susceptible to scratches.

The sample optical disks No. 4, which used the base material (b) with insufficient hardness, received scratches in three samples in the optical head contact test despite the addition of the reactive silicone to impart lubricity to the hard coat surface.

The sample optical disks No. 5, which used the silica fine particle-free base material (c), were resistant to scratches in the optical head contact test. Nevertheless, the large initial tilt angle and the large tilt angle observed after storage in a high temperature, high humidity environment suggest that these disks are not suitable for use as optical disks. While increasing the ratio of the polyfunctional monomer or the polyfunctional oligomer in the base material increased the hardness of the base material, the contraction of the material upon curing was also increased significantly, leading to unfavorably large tilt angles.

In the above-mentioned Example, the hard coat layer was given to the phase-change type optical disks. However, the present invention can be applied to read-only type optical disks or write-once type optical disks as well as optical disks having a phase-change type recording layer. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

According to the present invention, an optical information medium that is less susceptible to warp in the disk surface while offering significantly high scratch resistance and abrasion resistance is provided. According to the present invention, a method for producing an optical information medium that is less susceptible to warp in the disk surface while offering significantly high scratch resistance and abrasion resistance is provided.

The invention claimed is:

1. An optical information medium comprising a supporting substrate and a film element, the film element disposed on the supporting substrate and composed of one or more layers including at least a recording layer or a reflective layer, wherein at least one of the supporting substrate-side surface and the film element-side surface is formed of a hard coat layer of a cured product of a composition comprising:
   (A) inorganic fine particles with an average particle size of 100 nm or less;
   (B) a reactive silicone; and
   (C) an active energy ray-curable compound.

2. The optical information medium according to claim 1, wherein the inorganic fine particles (A) are fine particles of a metal or a semi-metal oxide, or fine particles of a metal or a semi-metal sulfide.

3. The optical information medium according to claim 1, wherein the inorganic fine particles (A) are fine particles of silica.

4. The optical information medium according to claim 3, wherein the fine particles of silica are modified on the surface with a hydrolyzable silane compound including an active energy ray-reactive group.

5. The optical information medium according to claim 1, wherein the reactive silicone (B) comprises at least one reactive group selected from the group consisting of (meth) acryloyl group, vinyl group, and mercapto group.

6. The optical information medium according to claim 1, wherein the reactive silicone (B) comprises two or more (meth)acryloyl groups within its molecule.

7. The optical information medium according to claim 1, wherein the composition comprises 5 wt % or more and 80 wt % or less of the inorganic fine particles (A), 0.0 wt % or more and 1 wt % or less of the reactive silicone (B), and 19 wt % or more and 94.99 wt % or less of the active energy ray-curable compound (C) with respect to the total amount of the components (A), (B), and (C).

8. The optical information medium according to claim 1, wherein the composition further comprises a photopolymerization initiator.

9. The optical information medium according to claim 1, wherein information is optically recorded or reproduced by the light incident upon the supporting substrate-side or the film element-side of the information medium.

10. The optical information medium according to claim 1, wherein either one of the supporting substrate-side surface or the film element-side surface upon which the light is incident is formed of the hard coat layer.

11. The optical information medium according to claim 1, wherein the supporting substrate has a thickness of 0.3 mm to 1.6 mm.

12. The optical information medium according to claim 1, wherein the supporting substrate has a thickness of 0.5 mm to 1.3 mm.

13. The optical information medium according to claim 1 comprising the reflective layer having a thickness of from 20 nm to 200 nm.

14. The optical information medium according to claim 1 comprising the recording layer comprising a material selected from the group consisting of Ge—Sb—Te, In—Sb—Te, Sn—Se—Te, Ge—Te—Sn, In—Se—Tl, and In—Sb—Te.

15. The optical information medium according to claim 14, wherein the material comprises at least one metal selected from the group consisting of Co, Pt, Pd, Au, Ag, Ir, Nb, Ta, V, W, Ti, Cr, Zr, Bi, and In.

16. The optical information medium according to claim 1, wherein the composition comprises 10 wt % or more and 60 wt % or less of the inorganic fine particles (A), 0.01 wt % or more and 1 wt % or less of the reactive silicone (B), and 39 wt % or more and 89.99 wt % or less of the active energy ray-curable compound (C) with respect to the total amount of the components (A), (B) and (C).

17. A method for producing an optical information medium, comprising the steps of:

forming, on a supporting substrate, a film element composed of one or more layers including at least a recording layer or a reflective layer;

applying a composition onto at least one of the surface of the film element and the surface of the supporting substrate opposite to the film element-formed side, the composition comprising (A) inorganic fine particles with an average particle size of 100 nm or less, (B) a reactive silicone, and (C) an active energy ray-curable compound; and irradiating active energy rays onto the applied composition to cure the composition and to thus form a hard coat layer.

18. The method for producing an optical information medium according to claim 17, wherein the composition further comprises a non-reactive organic solvent, and following the application of the composition and prior to the irradiation of the active energy rays to cure the composition and to thus form a hard coat layer, the non-reactive organic solvent is removed by heat-drying.

19. The method for producing an optical information medium according to claim 18, wherein the heat-drying occurs at a temperature of from 40° C. or more and 100° C. or less and over a time period of from 30 seconds or more and 8 minutes or less.

20. The method for producing an optical information medium according to claim 18, wherein the heat-drying occurs at a temperature of from 40° C. or more and 100° C. or less and over a time period of from 1 minute or more and 5 minutes or less.

* * * * *